UNITED STATES PATENT OFFICE.

GEORGES AUGUSTE PAULIN, OF ASNIÈRES, FRANCE.

MANUFACTURE OF A CLEANSING MATERIAL.

1,327,631.     Specification of Letters Patent.     Patented Jan. 13, 1920.

No Drawing.     Application filed July 12, 1918. Serial No. 244,568.

*To all whom it may concern:*

Be it known that I, GEORGES AUGUSTE PAULIN, citizen of France, residing at 51 Avenue Flachat, Asnières, France, have invented new and useful Improvements in Manufacture of a Cleansing Material, of which the following is a specification.

This invention relates to a product for cleaning materials, more particularly fabrics of silk, wool, cotton or the like, without using soap. The product is made by emulsifying casein.

The manufacture involves a series of operations as follows.

1.—Into a suitable vessel is introduced a kilo of commercial casein in the form of powder or flour; this is hydrated by pouring on to it in several doses about one and a half liters of water; during the addition of the water the whole is mixed and after the addition the mass is allowed to swell for about an hour.

2.—A saturated solution is made by dissolving 2 kilos of anhydrous sodium carbonate in 800 c. c. of water at 60 to 70° C. and allowing the solution to cool; in lieu of sodium carbonate, there may be used potassium carbonate or ammonia, baryta, or any other alkali.

3.—The products of the first two operations are mixed together and kneaded until the excess of water can be separated by decantation. The whole is allowed to stand for about two hours.

Instead of separating the water by decantation it may be separated by straining.

4.—1.5 kilos of commercial resin are melted in a metal basin over a gentle fire and are saponified by means of 750 c. c. of caustic soda lye of 30° Baumé specific gravity. In lieu of resin soap, there may be used any other soluble soap.

There is now added with constant stirring to the saponified resin the liquid obtained in the third operation, until there is obtained a perfectly homogeneous soft product, care being taken not to allow the temperature to rise to the boiling point. The mass is then allowed to cool to about 50° C.

There is then added the material from which the liquid has been decanted in the third operation, and stirring is continued until the product is perfectly homogeneous.

After cooling, the new product is a slightly granular mass; it may be used in this form or it may be pressed into cake-form like soap. For the purpose to granulate it completely, a sufficiency of sodium carbonate may be added in order to obtain a pulverulent product.

The plasticity and fluidity of the product depend on the quantity of water used in the first operation. When this amount is one and a half liters, as indicated above, the product is solid; when three liters are used it is soft.

The product prepared as described above has a slight odor of turpentine. To correct or suppress this odor there may be added in the final stage of the preparation a few drops of any aromatic spirit, such as oil of thyme, oil of lemon thyme, essence of mirbane, or the like.

The product is soluble in cold water and in boiling alcohol and has the property of cleaning and scouring all fabrics and textile materials without the use of soap. With use of the material linen may be washed cold.

What I claim is:—

1. The manufacture of a cleansing material which consists in hydrating casein by the addition thereto of water, intimately mixing the hydrated casein with a saturated solution of carbonate of soda, removing from the mixture the excess of water, and stirring into the mixture saponified resin.

2. A cleansing material comprising so-called caseinates and saponified resin, being intimately mixed together, the product being soluble in cold water and in boiling alcohol.

3. A cleansing material as specified in claim 2, in which the re-action products of the casein and sodium carbonate (caseinates) and saponified resin are used in about the following proportions: 1 kilo of casein (powdered), 2 kilos of anhydrous sodium carbonate, 1.5 kilos of saponified resin.

In testimony whereof I have signed my name to this specification in the presence of two subscribing witnesses.

GEORGES AUGUSTE PAULIN.

Witnesses:
MARCEL GUILLEMOT,
JOHN F. SIMONS.